(12) United States Patent
Yamamoto

(10) Patent No.: US 12,711,990 B2
(45) Date of Patent: Aug. 18, 2026

(54) DATA STORAGE DEVICE WITH ASYNCHRONOUS POSITION ERROR SIGNAL DEMODULATION WITH SPLIT BURST SERVO PATTERNS

(71) Applicant: WESTERN DIGITAL TECHNOLOGIES, INC., San Jose, CA (US)

(72) Inventor: Satoshi Yamamoto, Hollister, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/782,584

(22) Filed: Jul. 24, 2024

(65) Prior Publication Data

US 2026/0031107 A1 Jan. 29, 2026

(51) Int. Cl.

*G11B 5/56* (2006.01)
*G11B 5/596* (2006.01)
*G11B 21/02* (2006.01)

(52) U.S. Cl.

CPC .................................... *G11B 21/02* (2013.01)

(58) Field of Classification Search

CPC ............ G11B 5/59688; G11B 5/59627; G11B 2005/0021; G11B 5/00; G11B 5/09;
(Continued)

(56) References Cited

U.S. PATENT DOCUMENTS 5,089,757 A 2/1992 Wilson
5,717,538 A 2/1998 Cheung
(Continued)

FOREIGN PATENT DOCUMENTS

JP 2001014816 1/2001
JP 2012079402 4/2012
WO 1997032301 9/1997

OTHER PUBLICATIONS

Ma Kun; Servo Pattern Enhancements for High Areal Density Hard Disk Drives; School of Electrical & Electronic Engineering a thesis submitted to the Nanyang Technological University in partial fullment of the requirements for the degree of Doctor of Philosophy 2017; 174 pages https://dr.ntu .edu.sg/bitstream/10356/72656/1/SERVO%20PATTERN%20ENHANCEMENTS%20FOR%20HIGH%20AREAL %20DENSITY%20HARD%20DISK%20DRIVES.pdf.
(Continued)

*Primary Examiner* — Nabil Z Hindi
(74) *Attorney, Agent, or Firm* — Calderon Safran & Wright P.C.

(57) ABSTRACT

Various illustrative aspects are directed to a data storage device, comprising one or more disks; an actuator mechanism configured to position one or more heads proximate to a corresponding disk surface of the one or more disks; and one or more processing devices. The one or more processing devices comprise control circuitry which comprises an asynchronous demodulation module. The asynchronous demodulation module is configured to: receive demodulated split null burst signals based on the selected head reading a first set of bursts and a second set of bursts in a split burst servo pattern of the corresponding disk surface; and output, based on the demodulated split null burst signals, a radial position signal, indicative of a radial position of the selected head.

20 Claims, 7 Drawing Sheets

(58) Field of Classification Search
CPC .. G11B 5/54; G11B 20/12; G11B 5/56; G11B 5/58; G11B 5/59672; G11B 5/596; G11B 5/59666; G11B 5/5539; G11B 19/045; G11B 20/10388; G11B 27/36; G11B 5/556; G11B 5/5573; G11B 5/5543; G11B 20/1816; G11B 7/1263; G11B 5/012
USPC .......................................... 369/75, 77.01, 48
See application file for complete search history.

(56) References Cited

U.S. PATENT DOCUMENTS

| | | | | |
|---|---|---|---|---|
| 5,774,298 | A | 6/1998 | Cheung et al. | |
| 5,793,559 | A | 8/1998 | Shepherd et al. | |
| 5,818,659 | A * | 10/1998 | Cheung | G11B 5/59605 360/48 |
| 5,966,258 | A | 10/1999 | Bliss | |
| 6,181,505 | B1 | 1/2001 | Sacks | |
| 6,195,220 | B1 | 2/2001 | Ellis | |
| 6,243,224 | B1 | 6/2001 | Sacks | |
| 6,324,030 | B1 | 11/2001 | Cheung et al. | |
| 6,426,845 | B1 | 7/2002 | Sacks et al. | |
| 6,469,849 | B1 | 10/2002 | Ellis | |
| 6,977,792 | B1 | 12/2005 | Melrose et al. | |
| 7,023,631 | B2 * | 4/2006 | Zhang | G11B 5/59627 360/48 |
| 7,158,333 | B1 | 1/2007 | Sutardja | |
| 7,576,942 | B1 | 8/2009 | Karns et al. | |
| 7,583,469 | B1 | 9/2009 | Sutardja | |
| 7,619,841 | B1 | 11/2009 | Kupferman | |
| 7,764,458 | B1 | 7/2010 | Sutardja | |
| 7,835,094 | B2 | 11/2010 | Bedillion | |
| 7,898,762 | B1 | 3/2011 | Guo et al. | |
| 8,134,796 | B2 | 3/2012 | Bedillion | |
| 8,295,002 | B1 | 10/2012 | Katchmart | |
| 8,355,300 | B2 | 1/2013 | Grobis | |
| 8,462,454 | B1 | 6/2013 | Katchmart | |
| 8,531,798 | B1 | 9/2013 | Xi | |
| 8,705,191 | B1 | 4/2014 | Katchmart | |
| 8,711,504 | B1 | 4/2014 | Everett et al. | |
| 8,767,327 | B1 | 7/2014 | Saito et al. | |
| 8,792,200 | B1 | 7/2014 | Tam | |
| 9,053,728 | B1 | 6/2015 | French, Jr. | |
| 9,245,560 | B1 | 1/2016 | Nie et al. | |
| 9,286,927 | B1 | 3/2016 | Tang et al. | |
| 9,384,774 | B1 | 7/2016 | Nookala et al. | |
| 9,595,288 | B1 | 3/2017 | Chu et al. | |
| 9,626,989 | B1 | 4/2017 | Buch et al. | |
| 9,818,447 | B1 | 11/2017 | Zheng et al. | |
| 9,972,344 | B2 | 5/2018 | Ruan et al. | |
| 9,979,573 | B1 | 5/2018 | Marrow | |
| 9,984,719 | B2 | 5/2018 | Matousek et al. | |
| 10,601,617 | B1 | 3/2020 | Marrow et al. | |
| 10,720,177 | B1 | 7/2020 | Ng et al. | |
| 10,770,106 | B1 | 9/2020 | Mader et al. | |
| 10,783,912 | B1 | 9/2020 | Tu | |
| 10,997,997 | B1 | 5/2021 | Xiong | |
| 11,200,912 | B1 | 12/2021 | Guo et al. | |
| 11,450,346 | B2 | 9/2022 | Tatah et al. | |
| 11,830,524 | B1 | 11/2023 | Yasuna et al. | |
| 12,046,256 | B2 | 7/2024 | Yamamoto | |
| 12,100,431 | B1 | 9/2024 | Guo et al. | |
| 2003/0026016 | A1 | 2/2003 | Heydari et al. | |
| 2004/0090693 | A1 | 5/2004 | Zhang et al. | |
| 2005/0128634 | A1 | 6/2005 | Schmidt | |
| 2006/0215306 | A1 | 9/2006 | Ehrlich et al. | |
| 2007/0002487 | A1 | 1/2007 | Langlois et al. | |
| 2008/0266701 | A1 | 10/2008 | Albrecht | |
| 2008/0267029 | A1 | 10/2008 | Miles | |
| 2009/0310245 | A1 | 12/2009 | Miles | |
| 2013/0010384 | A1 | 1/2013 | Nonaka | |
| 2014/0233128 | A1 | 8/2014 | Zhang et al. | |
| 2020/0381016 | A1 | 12/2020 | Liu | |

OTHER PUBLICATIONS

Guoxiao Guo et al., “Servo Detection and Control Considering Servo Pattern Defects”, https://www.researchgate.net/publication/261225952_Servo_detection_and_control_considering_servo_pattern_defects, dated Jan. 2012, 3 pages.

* cited by examiner

DATA STORAGE DEVICE WITH ASYNCHRONOUS POSITION ERROR SIGNAL DEMODULATION WITH SPLIT BURST SERVO PATTERNS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges 60-6N recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge 6*i* comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge 64) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine actuators, in some examples.

SUMMARY

Various examples disclosed herein provide data storage devices such as hard disk drives with control circuitry that includes novel and inventive read/write channel circuitry and servo control processor. Read/write channel circuitry of this disclosure may perform inventive operations beyond the scope of conventional read/write circuitry, including generating a radial position signal and null burst squared signals, based on demodulated split null burst signals, in the read/write channel circuitry rather than in a servo control processor, including in asynchronous PES demodulation. Read/write channel circuitry performs direct radial position demodulation based on asynchronously sampled burst signals. Read/write channel circuitry thereby enables inventive advantages such as a smaller and faster servo control processor, and more accurate PES than is possible in conventional systems, in accordance with aspects of the present disclosure. Read/write channel circuitry further enables inventive advantages such as mitigating adverse effects that can result from servo pattern distortion caused by laser mode hop by generating demodulated split null burst signals based on read-back signals obtained from split null burst servo patterns.

Various illustrative aspects are directed to a data storage device, comprising: one or more disks; an actuator mechanism configured to position a selected head among one or more heads proximate to a corresponding disk surface among the one or more disks; and one or more processing devices. The one or more processing devices comprise control circuitry which comprises an asynchronous demodulation module. The asynchronous demodulation module is configured to: receive demodulated split null burst signals based on the selected head reading a first set of bursts and a second set of bursts in a split burst servo pattern of the corresponding disk surface; and output, based on the demodulated split null burst signals, a radial position signal, indicative of a radial position of the selected head.

Various illustrative aspects are directed to a method comprising receiving, by an asynchronous demodulation module of control circuitry of a data storage device, demodulated split null burst signals based on a selected head reading a first set of bursts and a second set of bursts in a split burst servo pattern of a corresponding disk surface. The method further comprises outputting, by the asynchronous demodulation module and based on the demodulated split null burst signals, a radial position signal indicative of a radial position of the selected head. The receiving and the outputting are performed by one or more processing devices individually or in combination.

Various illustrative aspects are directed to one or more processing devices comprising an asynchronous demodulation module of control circuitry of a data storage device. The asynchronous demodulation module comprises means for receiving demodulated split null burst signals based on a selected head reading a first set of bursts and a second set of bursts in a split burst servo pattern of a corresponding disk surface. The asynchronous demodulation module further comprises means for outputting, based on the demodulated split null burst signals, a radial position signal, indicative of a radial position of the selected head Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

DETAILED DESCRIPTION

Figure 1:
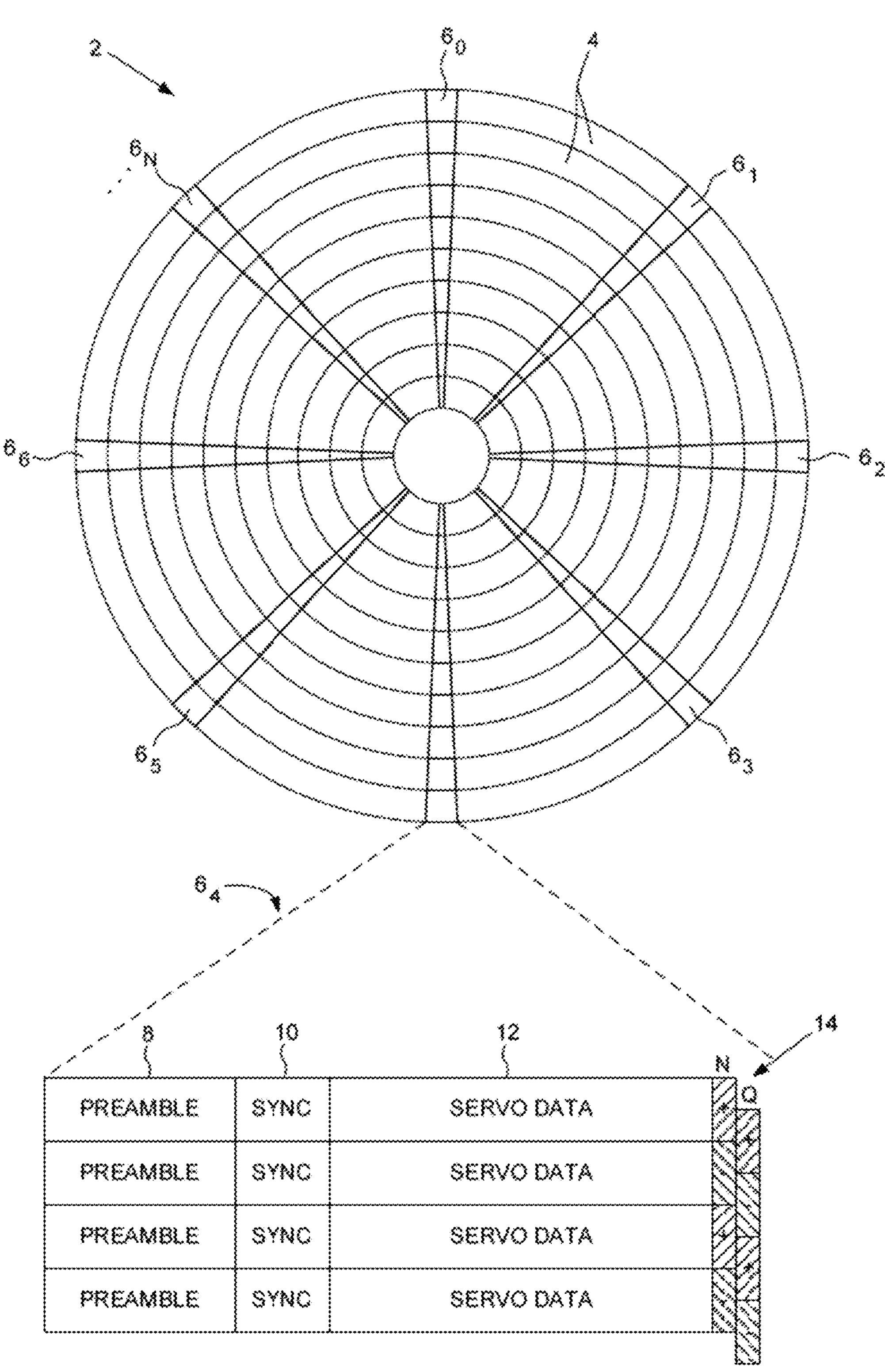
FIG. 1 shows a prior art disk format as comprising a number of radially-spaced, concentric servo tracks defined by servo wedges recorded around the circumference of each servo track.
Figures 2A, 2B, 2C:
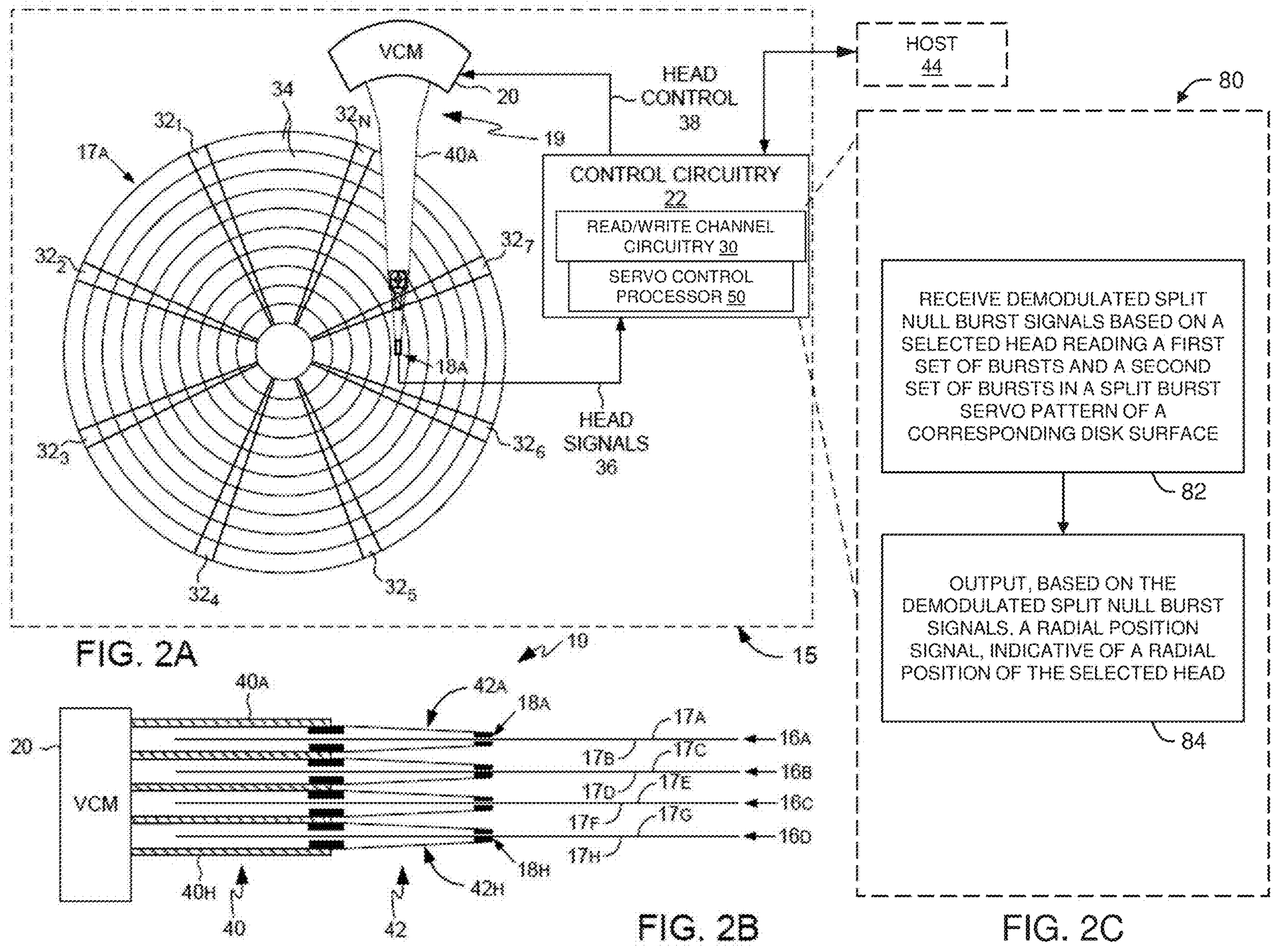
FIGS. 2A and 2B illustrate conceptual block diagrams of a top view and a side view of a data storage device in the form of a disk drive, in accordance with aspects of the present disclosure.
FIG. 2C depicts a flowchart for an example method that read/write channel circuitry of control circuitry of a disk drive may perform or execute in controlling the operations of the disk drive, including for receiving demodulated split null burst signals, and outputting, based on the demodulated split null burst signals, a radial position signal, in accordance with aspects of the present disclosure.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). Control circuitry 22 comprises read/write channel circuitry 30 and a servo control processor 50. FIG. 2C depicts a flowchart for an example method 80 that read/write channel circuitry 30 of control circuitry 22 may perform or execute in controlling the operations of disk drive 15, in accordance with aspects of the present disclosure, including operations involved in servo control and providing processed servo signals to servo control processor 50 for servo control processor 50 to generate position error signals (PES), and for receiving demodulated split null burst signals, and outputting, based on the demodulated split null burst signals, a radial position signal, in accordance with aspects of the present disclosure. Read/write channel circuitry 30 may perform inventive operations beyond the scope of conventional read/write circuitry, including generating a radial position signal and null burst squared signals, thereby enabling inventive advantages such as a smaller and faster servo control processor 50, and more accurate PES than is possible in conventional systems, in accordance with aspects of the present disclosure. Read/write channel circuitry 30 may additionally mitigate adverse effects that can result from servo pattern distortion caused by laser mode hop by generating demodulated split null burst signals based on read-back signals obtained from split null burst servo patterns.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples. Each suspension assembly 42 suspends a slider at a distal end thereof, with one of read/write heads 18 ("heads 18") mounted on the slider.

Each of actuator arms 40 is thus configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one primary actuator 20 in the example of FIGS. 2A and 2B, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or ten or eleven or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a greatly simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges 321-32N, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges 321-32N and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads 18 radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples. An actuator mechanism such as actuator arm assembly 19 may thus be configured to position heads 18, including a selected head among one or more heads 18, proximate to a corresponding disk surface 17 among the one or more disks 16.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In particular, read/write channel circuitry 30 of control circuitry 22 may receive demodulated split null burst signals based on a selected head reading a first set of bursts and a second set of bursts in a split burst servo pattern of a corresponding disk surface (82). Read/write channel circuitry 30 may further output, based on the demodulated split null burst signals, a radial position signal, indicative of a radial position of the selected head (84). Control circuitry 22, including read/write channel circuitry 30 and servo control processor 50, may further perform additional actions, methods, and techniques, in accordance with various aspects including as further described herein.

Figure 3:
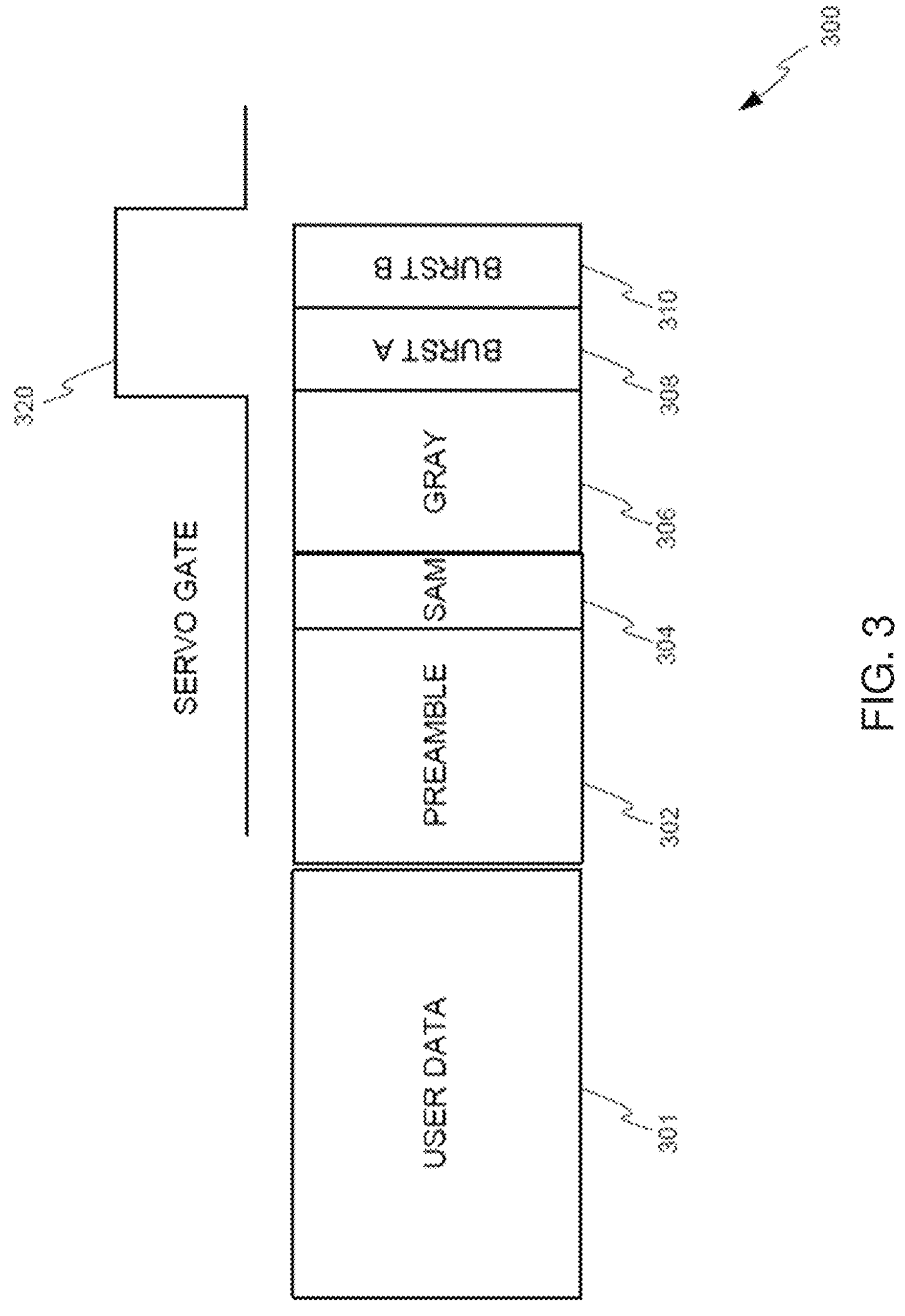
FIG. 3 illustrates an exemplary arrangement of a user data sector a servo sector of a track in accordance with aspects of the present disclosure.

FIG. 3 illustrates the fields in a selected servo ID (SID) 300, including a preamble 302, a Servo Address Mark (SAM) 304 used to synchronize data within the servo fields and provide timing information for write and read operations in the data portions of the disk, a Gray code 306 coarse track-ID (TID) number and additional information to identify the physical SID number, and A and B servo burst fields 308 and 310, respectively, which provide read signals to support generating fractional-track Position Error Signal (PES). SID 300 is a gapless SID, which has user data 301 written all the way up adjacent to preamble 302. Control circuitry 22 may be configured to implement gapless SIDS and sample the A and B servo burst fields 308 and 310 asynchronously without first synchronizing to a preamble, and open the servo gate 320 just prior to the A and B servo burst fields 308 and 310. This asynchronous servo burst field sampling provides the advantage of enabling more area of the track to be used for user data, but with the drawback of introducing a sampling timing phase error that is not present in synchronous servo burst field sampling.

Resolving the asynchronous sampling timing phase error would otherwise require several levels of substantial calculations by both the read/write channel circuitry 30 and then by the servo control processor 50 (as shown in FIG. 2A), requiring processing hardware and significant calculation time, but is greatly simplified in aspects of the present disclosure, which resolve asynchronous sampling timing phase error in read/write channel circuitry 30, with reduced hardware and faster speed than would otherwise be possible, among other inventive advantages. Read/write channel circuitry 30 of this disclosure is enabled to generate null burst squared signals and a radial position signal, e.g., Burst (A) 2, Burst (B) 2, and radial position x signals, respectively, to the servo control processor 50, enabling use of a simplified servo control processor 50 with reduced hardware requirements and faster speed than would otherwise be possible, among other inventive advantages, in various aspects of this disclosure.

With continued reference to FIG. 3, a heat assisted magnetic recording (HAMR) disk drive that utilizes conventional null burst servo patterns in servo burst fields 308 and 310 is susceptible to problems associated with laser mode hop. Laser mode hop (also referred to as mode hop) is a phenomenon in HAMR disk drives in which a laser diode, used to heat a surface of the disk during writing to the disk, suddenly and unpredictably changes between two or more modes in which it emits a laser. The change in mode can cause sudden shifts in magnitude of power of the laser being emitted by the laser diode. Because such laser mode hopping can create sudden, unpredictable changes in the laser power, laser mode hopping may also cause sudden, unpredictable write width changes, even while the write current applied to the write element remains constant. When such changes in write width occur during the writing of a servo pattern, the servo pattern that is written to the disk may have unwanted distortion in the pattern. Such distortion may result in degraded operational issues of a disk drive such as track squeeze and/or large repeatable runout (RRO) error. To mitigate the adverse effects that can result from servo pattern distortion caused by mode hop, various embodiments of the present disclosure utilize a split null burst servo pattern, instead of a conventional null burst servo pattern, in servo burst fields 308 and 310. Examples of such a split null burst servo pattern are described herein with respect to FIGS. 5A, 5B, 5C, and 5D.

Figure 4:
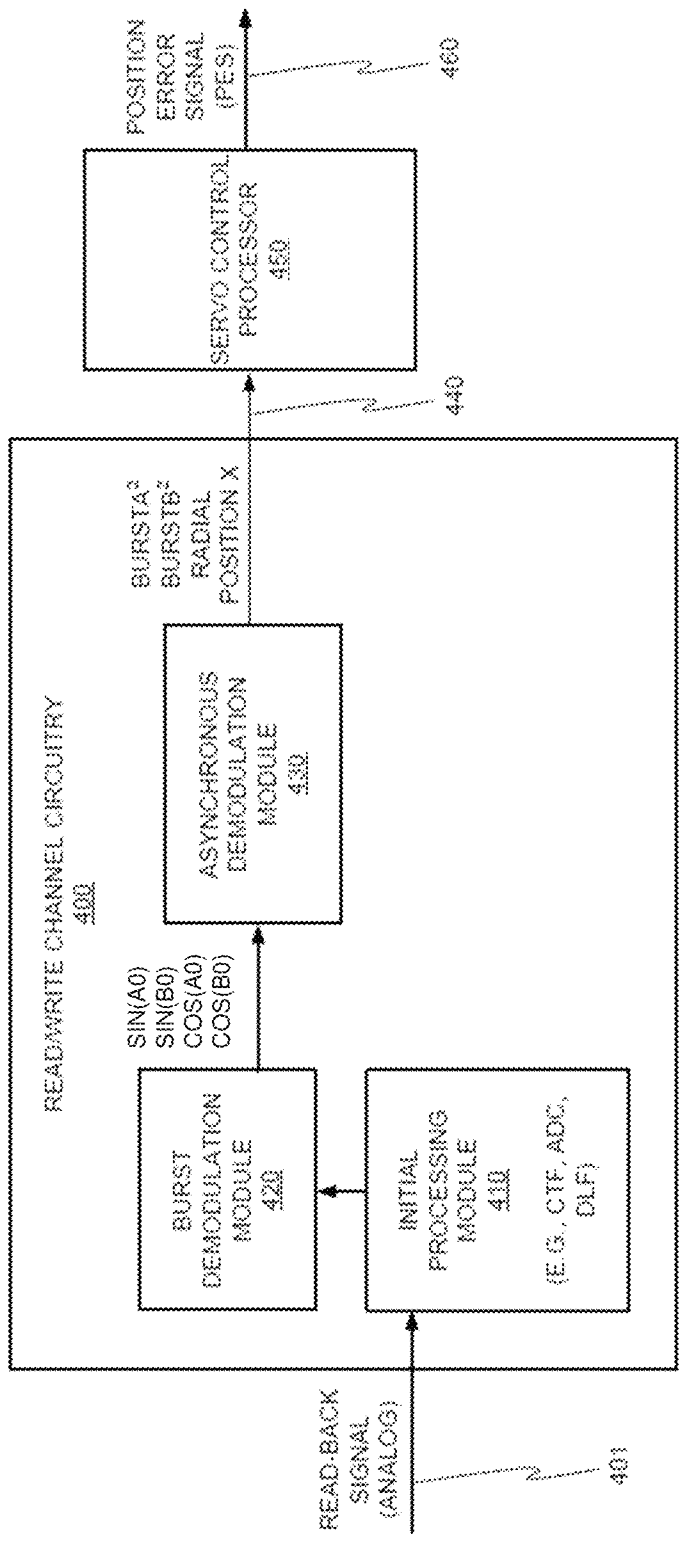
FIG. 4 depicts a conceptual block diagram of read/write channel circuitry and servo control processor, in accordance with aspects of the present disclosure.

FIG. 4 depicts a conceptual block diagram of read/write channel circuitry 400 and servo control processor 450, in accordance with aspects of the present disclosure. Read/write channel circuitry 400 and servo control processor 450 are an example implementation of read/write channel circuitry 30 and servo control processor 50 as shown in FIG. 2A and described above. Read/write channel circuitry 400 is configured to receive an analog read-back signal 401 from a head reading a corresponding disk surface (e.g., one of heads 18 reading one of disk surfaces 17 of FIG. 2B), and to generate and output signals to servo control processor 450 as described herein.

Read/write channel circuitry 400 includes initial processing module 410, burst demodulation module 420, and asynchronous demodulation module 430. Initial processing module 410 may include analog and/or digital filters and other pre-processing components such as a continuous time filter (CTF), an analog-to-digital converter (ADC), and a digital linear filter (DLF), in various examples. Initial processing module 410 receives the analog read-back signal as input, and outputs a filtered, digital read-back signal based on the analog read-back signal. Burst demodulation module 420 receives the digital read-back signal as input, and outputs, to asynchronous demodulation module 430, demodulated split null burst signals sin (A0), sin (B0), cos (A0), cos (B0) based on a selected head reading servo burst fields of the corresponding disk surface.

In embodiments, demodulated split null burst signals sin (A0), sin (B0), cos (A0), cos (B0) comprise: a first demodulated split null burst signal (e.g., sin (A0)) based on summing a first trigonometric function of respective values of the digital read-back signal sampled at respective bursts of a first set of bursts of a split null burst servo pattern; a second demodulated split null burst signal (e.g., cos (A0)) based on summing a second trigonometric function of the respective values of the digital read-back signal sampled at the respective bursts of the first set of bursts of the split null burst servo pattern; a third demodulated split null burst signal (e.g., sin (B0)) based on summing the first trigonometric function of respective values of the digital read-back signal sampled at respective bursts of a second set of bursts of the split null burst servo pattern; and a fourth demodulated split null burst signal (e.g., cos (B0)) based on summing the second trigonometric function of the respective values of the digital read-back signal sampled at respective bursts of the second set of bursts of the split null burst servo pattern. In embodiments, the first trigonometric function is a sine function, and the second trigonometric function is a cosine function; however, implementations are not limited to this example. In embodiments, the digital read-back signal is the digital read-back signal that is generated by initial processing module 410 based on analog read-back signal 401 that is obtained by a head (e.g. one of heads 18) reading a split null burst servo pattern on a disk surface (e.g., one of disk surfaces 17). Examples of demodulated split null burst signals generated from split null burst servo patterns are described herein with respect to FIGS. 5A, 5B, 5C, and 5D.

Asynchronous demodulation module 430 of read/write channel circuitry 400 receives demodulated split null burst signals sin (A0), sin (B0), cos (A0), and cos (B0) from burst demodulation module 420 as inputs. Asynchronous demodulation module 430 determines and outputs $BurstA^2$ and $BurstB^2$ null burst squared signals, and a radial position x signal, based on and as functions of demodulated split null burst signals sin (A0), sin (B0), cos (A0), and cos (B0). Asynchronous demodulation module 430 is configured to output $BurstA^2$ and $BurstB^2$ null burst squared signals and a radial position x signal as outputs of read/write channel circuitry 400.

$BurstA^2$ and $BurstB^2$ are examples of null burst squared signals. In various examples, asynchronous demodulation module 430 may generally be configured to output a first null burst squared signal and a second null burst squared signal based on the demodulated split null burst signals. In the example of FIG. 4, the first null burst squared signal comprises a null $BurstA^2$ signal, as an example of a first null burst squared signal, and the second null burst squared signal comprises a null $BurstB^2$ signal, as an example of a second null burst squared signal.

Asynchronous demodulation module 430 of read/write channel circuitry 400 may include normalization of the burst signals, and automatic phase correction capability, eliminating the need for separate burst signal normalization calculations and phase correction calculations by the servo control processor. Asynchronous demodulation module 430 may also provide more accurate automatic phase correction capability than is possible in conventional systems, which may ensure more accurate PES output and better PES performance than is possible in conventional systems. Asynchronous demodulation module 430 may provide wider position coverage than in conventional read/write channels, and may cover a full servo track, thereby enabling fewer stitching points and simpler YMK (or servo raw position, or track number plus PES) position signal calculation by servo control processor 450, thus further enabling servo control processor 450 to be simpler and faster, in various examples.

Read/write channel circuitry 400 is connected via channel 440 to servo control processor 450. Servo control processor 450 is configured to receive the radial position x signal and the BurstA$^2$ and BurstB$^2$ null burst squared signals from asynchronous demodulation module 430. Servo control processor 450 is configured to output a position error signal (PES) based on the radial position x signal, the first null burst squared (BurstA$^2$) signal, and the second null burst squared (BurstB$^2$) signal.

Conventionally, read/write channel circuitry is incapable of generating outputs such as radial position x, and it is required for the servo control processor to perform processing to generate radial position x. In aspects of this disclosure, because read/write channel circuitry 400 generates outputs such as radial position x, read/write channel circuitry 400 enables servo control processor 450 to be simpler, smaller, and faster than in conventional systems. For example, read/write channel circuitry 400 eliminates the need for servo control processor 450 to have and to perform lookups in a phase profile model correction table per reader, or to be configured to perform a sine polynomial P/Q burst signal approximation calculation. Servo control processor 450 generates a position error signal (PES) based on its inputs from read/write channel circuitry 400, and from track number and target track inputs in various examples, and outputs the PES via PES output channel 460.

Figure 5A:
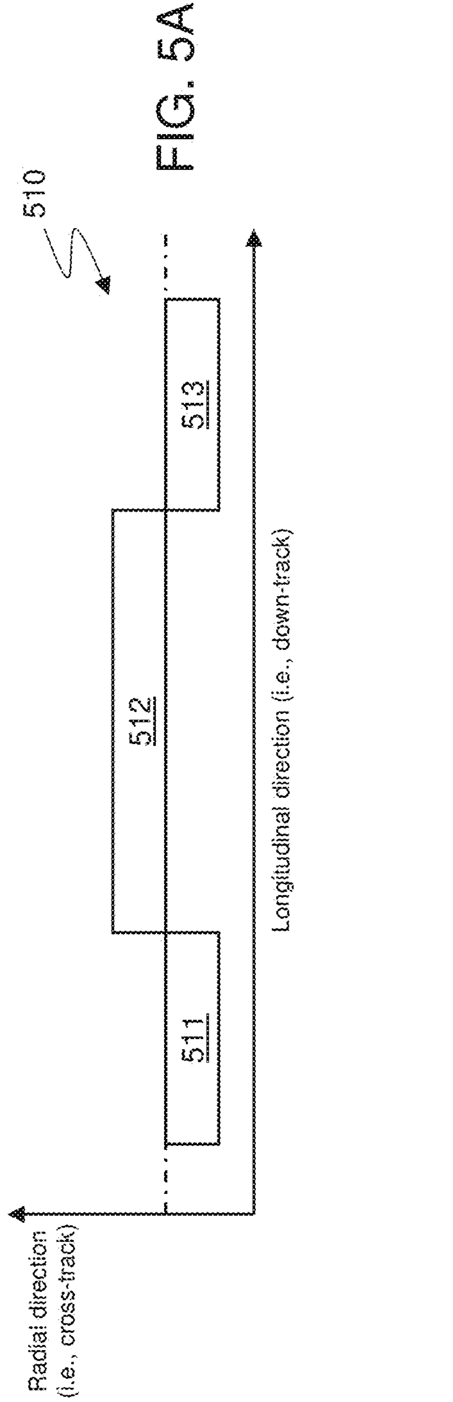
FIG. 5A shows a conceptual diagram of a 3-burst split null burst servo pattern that may be used with read/write channel circuitry of FIG. 4 in accordance with aspects of the present disclosure.

FIG. 5A shows a conceptual diagram of a 3-burst split null burst servo pattern 510 that may be used with read/write channel circuitry 400 of FIG. 4 in accordance with aspects of the present disclosure. The 3-burst split null burst servo pattern 510 includes first burst 511, second burst 512, and third burst 513. First burst 511 and third burst 513 may constitute a first set of bursts corresponding to a P burst of a null burst servo pattern, and second burst 512 may constitute a second set of bursts corresponding to a Q burst of the same null burst servo pattern. In embodiments, each of first burst 511 and third burst 513 has a first length in the longitudinal direction of the track containing the servo pattern, second burst 512 has a second length in the longitudinal direction of the track, and the first length is approximately half the second length. In embodiments, each of first burst 511 and third burst 513 is at a first radial location on the disk, and second bust 512 is at a second radial location different than the first radial location. In embodiments, first burst 511, second burst 512, and third burst 513 are arranged in an alternating manner along the longitudinal direction.

In demodulating 3-burst split null burst servo pattern 510 of FIG. 5A, burst demodulation module 420 of FIG. 4 determines demodulated split null burst signals sin (A0), sin (B0), cos (A0), cos (B0) based on functions of respective amplitude values (e.g., A, B, C) of the digital read-back signal sampled at each of the respective bursts 511, 512, and 513. In this example, A may represent one or more amplitude values of the digital read-back signal sampled at first burst 511, B may represent one or more amplitude values of the digital read-back signal sampled at second burst 512, and C may represent one or more amplitude values of the digital read-back signal sampled at third burst 513. In embodiments, burst demodulation module 420 determines demodulated split null burst signals sin (A0), sin (B0), cos (A0), cos (B0) of FIG. 4 by summing trigonometric functions of respective amplitude values (e.g., A, B, C) of the digital read-back signal sampled at each of the respective bursts 511, 512, and 513. In one exemplary implementation, the demodulated split null burst signals are calculated according to: sin (A0)=sin (A)+sin (C); cos (A0)=cos (A)+cos (C); sin (B0)=sin (B); and cos (B0)=cos (B). As described with respect to FIG. 4, these demodulated split null burst signals are input to asynchronous demodulation module 430, which uses the demodulated split null burst signals to calculate the BurstA$^2$ and BurstB$^2$ null burst squared signals and a radial position x signal.

Figure 5B:
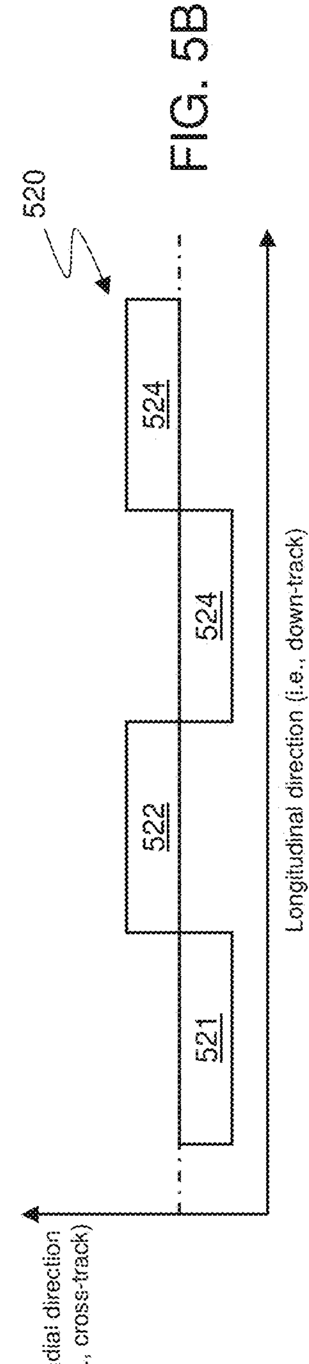
FIG. 5B shows a conceptual diagram of a 4-burst split null burst servo pattern that may be used with read/write channel circuitry of FIG. 4 in accordance with aspects of the present disclosure.

FIG. 5B shows a conceptual diagram of a 4-burst split null burst servo pattern 520 that may be used with read/write channel circuitry 400 of FIG. 4 in accordance with aspects of the present disclosure. The 4-burst split null burst servo pattern 520 includes first burst 521, second burst 522, third burst 523, and fourth burst 524. First burst 521 and third burst 523 may constitute a first set of bursts corresponding to a P burst of a null burst servo pattern, and second burst 522 and fourth burst 524 may constitute a second set of bursts corresponding to a Q burst of the same null burst servo pattern. In embodiments, each of first burst 521, second burst 522, third burst 523, and fourth burst 524 has approximately a same length in the longitudinal direction of the track containing the servo pattern. In embodiments, each of first burst 521 and third burst 523 is at a first radial location on the disk, and each of second bust section 522 and fourth burst 524 is at a second radial location different than the first radial location. In embodiments, first burst 521, second burst 522, third burst 523, and fourth burst 524 are arranged in an alternating manner along the longitudinal direction.

In demodulating 4-burst split null burst servo pattern 520 of FIG. 5B, burst demodulation module 420 of FIG. 4 determines demodulated split null burst signals sin (A0), sin (B0), cos (A0), cos (B0) based on functions of respective amplitude values (e.g., A, B, C, D) of the digital read-back signal sampled at each of the respective bursts 521, 522, 523, and 524. In this example, A may represent one or more amplitude values of the digital read-back signal sampled at first burst 521, B may represent one or more amplitude values of the digital read-back signal sampled at second burst 522, C may represent one or more amplitude values of the digital read-back signal sampled at third burst 523, and D may represent one or more amplitude values of the digital read-back signal sampled at fourth burst 524. In embodiments, burst demodulation module 420 determines demodulated split null burst signals sin (A0), sin (B0), cos (A0), cos (B0) of FIG. 4 by summing trigonometric functions of respective amplitude values (e.g., A, B, C, D) of the digital read-back signal sampled at each of the respective bursts 521, 522, 523, and 524. In one exemplary implementation, the demodulated split null burst signals are calculated according to: sin (A0)=sin (A)+sin (C); cos (A0)=cos (A)+cos (C); sin (B0)=sin (B)+sin (D); and cos (B0)=cos (B)+cos (D). As described with respect to FIG. 4, these demodulated split null burst signals are input to asynchronous demodulation module 430, which uses the demodulated split null burst signals to calculate the BurstA$^2$ and BurstB$^2$ null burst squared signals and a radial position x signal.

Figures 5C, 5D:
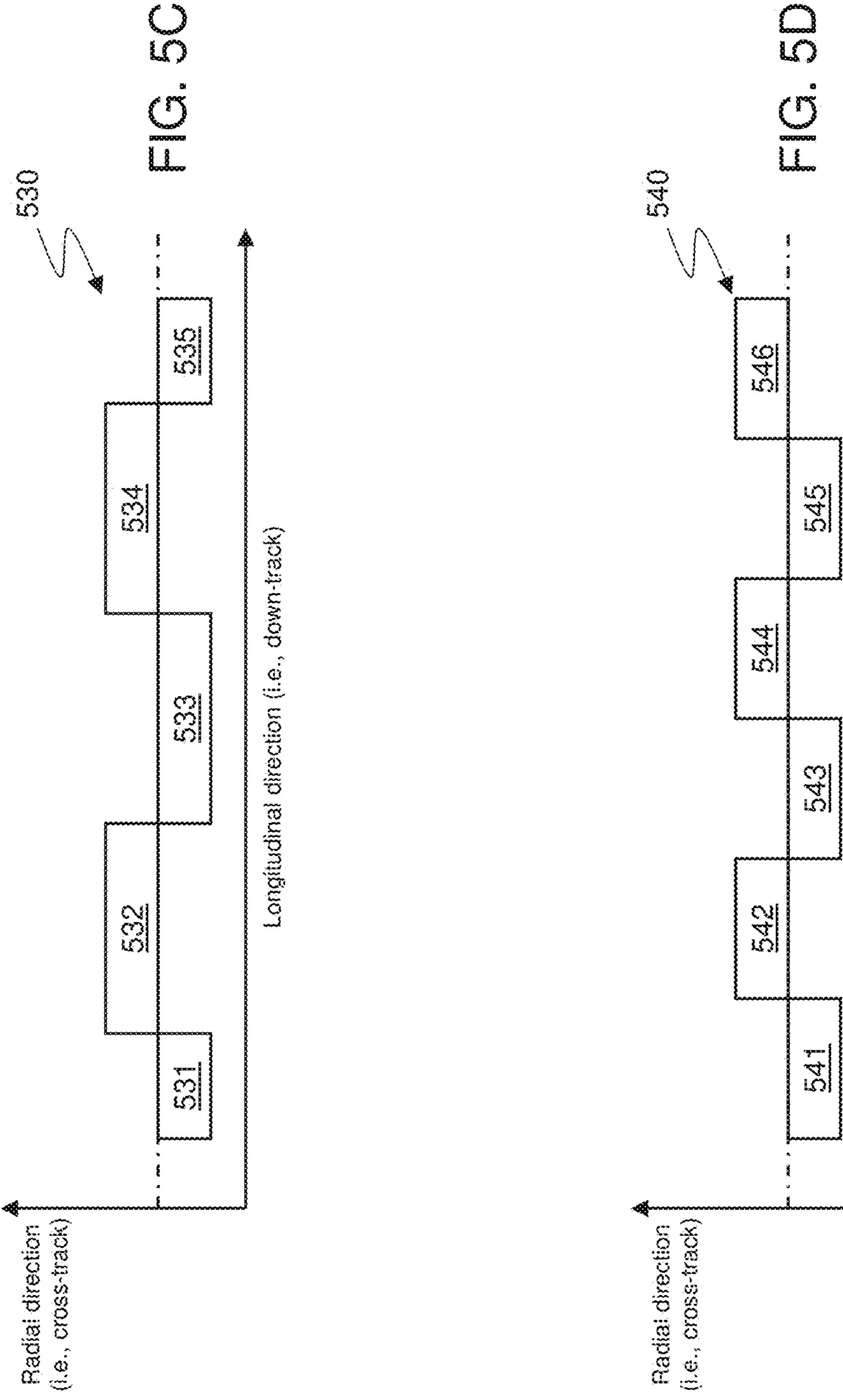
FIG. 5C shows a conceptual diagram of a 5-burst split null burst servo pattern that may be used with read/write channel circuitry of FIG. 4 in accordance with aspects of the present disclosure.
FIG. 5D shows a conceptual diagram of a 6-burst split null burst servo pattern that may be used with read/write channel circuitry of FIG. 4 in accordance with aspects of the present disclosure.

FIG. 5C shows a conceptual diagram of a 5-burst split null burst servo pattern 530 that may be used with read/write channel circuitry 400 of FIG. 4 in accordance with aspects of the present disclosure. The 5-burst split null burst servo pattern 530 includes first burst 531, second burst 532, third burst 533, fourth burst 534, and fifth burst 535. First burst 531, third burst 533, and fifth burst 535 may constitute a first set of bursts corresponding to a P burst of a null burst servo pattern, and second burst 532 and fourth burst 534 may constitute a second set of bursts corresponding to a Q burst of the same null burst servo pattern. In embodiments, each of first burst 531 and fifth burst 535 has a first length in the longitudinal direction of the track containing the servo pattern, each second burst 532, third burst 533, and fourth burst 534 has a second length in the longitudinal direction of the track, and the first length is approximately half the second length. In embodiments, each of first burst 531, third burst 533, and fifth burst 535 is at a first radial location on the disk, and each of second bust section 532 and fourth burst 534 is at a second radial location different than the first radial location. In embodiments, first burst 531, second burst 532, third burst 533, fourth burst 534, and fifth burst 535 are arranged in an alternating manner along the longitudinal direction.

In demodulating 5-burst split null burst servo pattern 530 of FIG. 5C, burst demodulation module 420 of FIG. 4 determines demodulated split null burst signals sin (A0), sin (B0), cos (A0), cos (B0) based on functions of respective amplitude values (e.g., A, B, C, D, E) of the digital read-back signal sampled at each of the respective bursts 531, 532, 533, 534, and 535. In this example, A may represent one or more amplitude values of the digital read-back signal sampled at first burst 531, B may represent one or more amplitude values of the digital read-back signal sampled at second burst 532, C may represent one or more amplitude values of the digital read-back signal sampled at third burst 533, D may represent one or more amplitude values of the digital read-back signal sampled at fourth burst 534, and E may represent one or more amplitude values of the digital read-back signal sampled at fifth burst 535. In embodiments, burst demodulation module 420 determines demodulated split null burst signals sin (A0), sin (B0), cos (A0), cos (B0) of FIG. 4 by summing trigonometric functions of respective amplitude values (e.g., A, B, C, D, E) of the digital read-back signal sampled at each of the respective bursts 531, 532, 533, 534, 535. In one exemplary implementation, the demodulated split null burst signals are calculated according to: sin (A0)=sin (A)+sin (C)+sin (E); cos (A0)=cos (A)+cos (C)+cos (E); sin (B0)=sin (B)+sin (D); and cos (B0)=cos (B)+cos (D). As described with respect to FIG. 4, these demodulated split null burst signals are input to asynchronous demodulation module 430, which uses the demodulated split null burst signals to calculate the $BurstA^2$ and $BurstB^2$ null burst squared signals and a radial position x signal.

FIG. 5D shows a conceptual diagram of a 6-burst split null burst servo pattern 540 that may be used with read/write channel circuitry 400 of FIG. 4 in accordance with aspects of the present disclosure. The 6-burst split null burst servo pattern 540 includes first burst 541, second burst 542, third burst 543, fourth burst 544, fifth burst 545, and sixth burst 546. First burst 541, third burst 543, and fifth burst 545 may constitute a first set of bursts corresponding to a P burst of a null burst servo pattern, and second burst 542, fourth burst 544, and sixth burst 546 may constitute a second set of bursts corresponding to a Q burst of the same null burst servo pattern. In embodiments, each of first burst 541, second burst 542, third burst 543, fourth burst 544, fifth burst 545, and sixth burst 546 has a same length in the longitudinal direction of the track containing the servo pattern. In embodiments, each of first burst 541, third burst 543, and fifth burst 545 is at a first radial location on the disk, and each of second bust section 542, fourth burst 544, and sixth burst 546 is at a second radial location different than the first radial location. In embodiments, first burst 541, second burst 542, third burst 543, fourth burst 544, fifth burst 545, and sixth burst 546 are arranged in an alternating manner along the longitudinal direction.

In demodulating 6-burst split null burst servo pattern 530 of FIG. 5C, burst demodulation module 420 of FIG. 4 determines demodulated split null burst signals sin (A0), sin (B0), cos (A0), cos (B0) based on functions of respective amplitude values (e.g., A, B, C, D, E, F) of the digital read-back signal sampled at each of the respective bursts 541, 542, 543, 544, 545, 546. In this example, A may represent one or more amplitude values of the digital read-back signal sampled at first burst 541, B may represent one or more amplitude values of the digital read-back signal sampled at second burst 542, C may represent one or more amplitude values of the digital read-back signal sampled at third burst 543, D may represent one or more amplitude values of the digital read-back signal sampled at fourth burst 544, E may represent one or more amplitude values of the digital read-back signal sampled at fifth burst 545, and F may represent one or more amplitude values of the digital read-back signal sampled at sixth burst 546. In embodiments, burst demodulation module 420 determines demodulated split null burst signals sin (A0), sin (B0), cos (A0), cos (B0) of FIG. 4 by summing trigonometric functions of respective amplitude values (e.g., A, B, C, D, E, F) of the digital read-back signal sampled at each of the respective bursts 541, 542, 543, 544, 545, 546. In one exemplary implementation, the demodulated split null burst signals are calculated according to: sin (A0)=sin (A)+sin (C)+sin (E); cos (A0)=cos (A)+cos (C)+cos (E); sin (B0)=sin (B)+sin (D)+sin (F); and cos (B0)=cos (B)+cos (D)+cos (F). As described with respect to FIG. 4, these demodulated split null burst signals are input to asynchronous demodulation module 430, which uses the demodulated split null burst signals to calculate the $BurstA^2$ and $BurstB^2$ null burst squared signals and a radial position x signal.

Any one of the 3-burst split null burst servo pattern 510, 4-burst split null burst servo pattern 520, the 5-burst split null burst servo pattern 530, or 6-burst split null burst servo pattern 540 may be included in a servo wedge 32 of a servo track 34 of a disk 16 such as that shown in FIG. 2A. The servo wedge 32 may additionally include a set of preambles and other servo information such as a set of servo index marks (SIM) or servo address marks (SAM), and Gray coded track address representing the address of the corresponding servo track. The servo wedge may be implemented in a gapless manner as described with respect to FIG. 3 (i.e., preceded by user data that is written adjacent to a preamble of the servo wedge) and may be utilized with asynchronous servo burst field sampling as described herein.

In various embodiments, the split null burst servo pattern (e.g., such as pattern 510, 520, 530, or 540) is written such that each of the bursts in the first set of bursts has a same first pattern polarity, and each of the bursts in the second set of bursts has a same second pattern polarity different than the first pattern polarity. In various embodiments, the first pattern polarity and the second pattern polarity are selected such that a polarity of the read-back signal (e.g., 401 of FIG. 4) when reading the first set of bursts is inverted (e.g., 180° offset) relative to the polarity of the read-back signal when reading the second set of bursts.

In embodiments, read/write channel circuitry 400 of FIG. 4 may sample the digital read-back signal at multiple locations within each respective burst of the first set of bursts and at multiple locations each respective burst of the second set of bursts, and burst demodulation module 420 may use trigonometric functions of the these multiple sampled values in calculating the demodulated split null burst signals sin (A0), sin (B0), cos (A0), cos (B0). Different numbers of samples per cycle and different numbers of cycles per burst may be used to ensure that a total number of samples taken at the first set of bursts equals a total number of samples taken at the second set of bursts. Referring to 3-burst split null burst servo pattern 510 as an example, read/write channel circuitry 400 of FIG. 4 may use four cycles with eight samples per cycle for first burst 511, eight cycles with eight samples per cycle for second burst 512, and four cycles with eight samples per cycle for third burst 513. In this example, read/write channel circuitry 400 obtains sixty-four samples from the first set of bursts (i.e., first burst 511 and third burst 513) and sixty-four samples from the second set of bursts (i.e., second burst 512).

Figure 6:
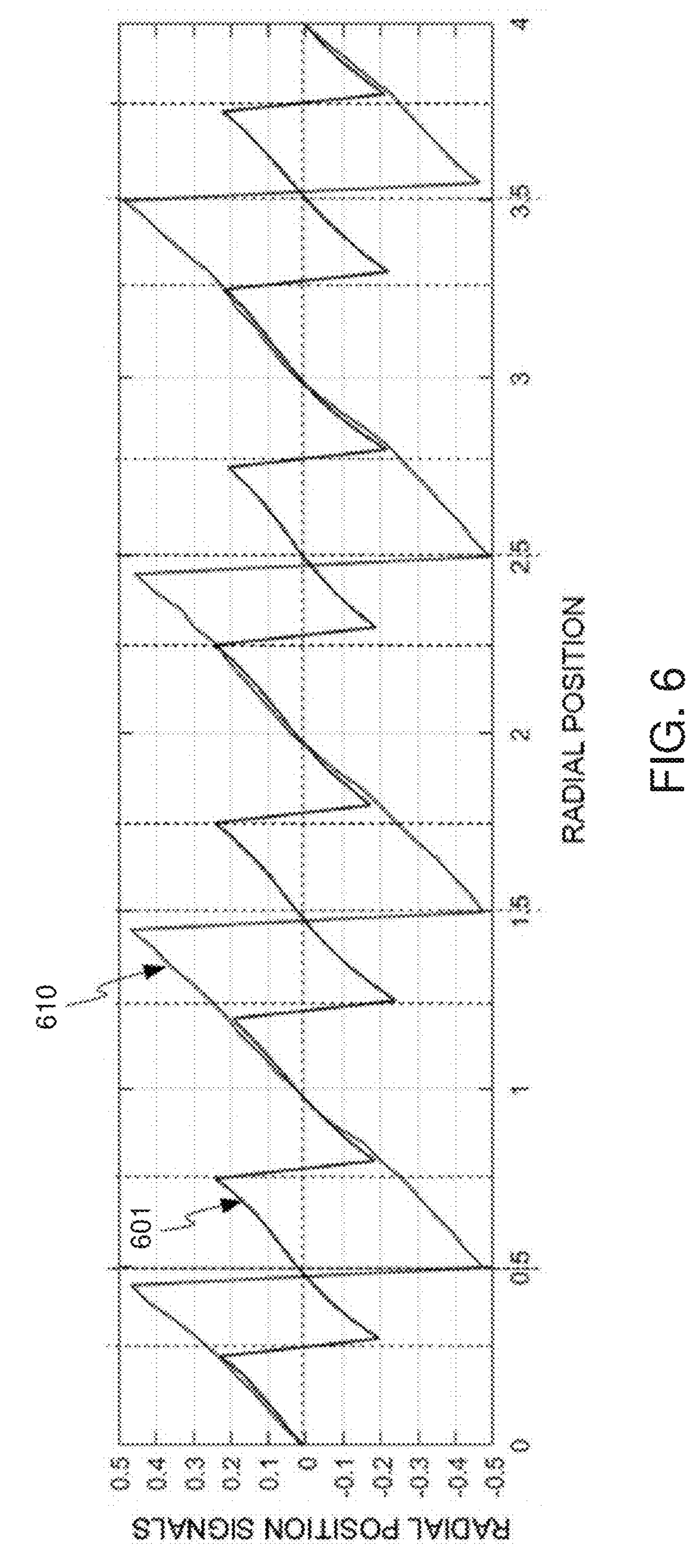
FIG. 6 shows a comparative graph of radial position signal cross-track profile of a normalized servo burst radial position signal over radial position generated by an asynchronous demodulation module based on the demodulated split null burst signals, compared with a conventional position signal cross-track profile, in accordance with aspects of the present disclosure.

FIG. 6 shows a comparative graph 600 of radial position signal cross-track profile 610, of a normalized P/Q servo burst radial position signal (y axis) over radial position x (x axis) generated by asynchronous demodulation module 430 of FIG. 4 based on the demodulated split null burst signals, contrasted with a conventional position signal cross-track profile 601, in accordance with aspects of the present disclosure. Whereas the conventional position signal 601 only covers half a servo track (−0.25 through +0.25), and has two required stitching points within the servo track, the radial position signal 610 generated by asynchronous demodulation module 430 of FIG. 4 covers a full servo track (−0.50 through +0.50), and is free of stitching points across substantially the entirety of the servo track (with the only stitching points approximately coinciding with the margins between servo tracks), in this example. This full servo track radial position signal coverage of the present disclosure enables inventive advantages such as requiring fewer stitching points for stitching PES components and simplifying a YMK (or track number plus PES) position signal calculation by the servo control processor, thus further enabling the servo control processor to be simpler and faster, in various examples. Asynchronous demodulation module 430 also inherently normalizes the servo burst position signal and so eliminates the need to perform a separate P/Q servo burst normalization calculation, in various examples.

Asynchronous demodulation module 430 may thus be configured to output radial position signal 610 such that radial position signal 610 covers substantially a full servo track, e.g., 0.5 to 1.5, 1.5 to 2.5, 2.5 to 3.5 along the x axis, indicating radial position, in FIG. 6. Radial position signal 610 may be considered to cover "substantially" the full servo track in that it covers the full servo track minus a small edge margin for transition (e.g., the near-vertical transitions proximate to the radial position track margins 0.5, 1.5, 2.5, 3.5 along the x axis in FIG. 6). Asynchronous demodulation module 430 is further configured to output radial position signal 610 such that radial position signal 610 covers the full servo track from a minus substantially half-track position signal to a plus substantially half-track position signal for the full servo track, corresponding to a minus substantially half-track position of the full servo track to a plus substantially half-track position of the full servo track. Asynchronous demodulation module 430 is further configured to output radial position signal 610 such that the radial position signal covers the full servo track with a single continuous position signal with a substantially continuous slope and free of stitching points within the radial position signal covering substantially the full servo track (e.g., in contrast to conventional position signal 601, which has near-vertical transition stitching points at minus and plus half a servo track (−0.25 and +0.25) in each servo track radial position range).

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprises logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method. Steps of method 80, and other methods of this disclosure, may be performed individually or in combination by one or more processing devices. For example, in some implementations, the one or more processing devices may comprise a single processing device that performs all the steps of such a method. In some implementations, different respective ones of the one or more processing devices may perform different respective steps of such a method. For example, in some implementations, the one or more processing devices may comprise at least a first processing device that performs a first subset of the steps of such a method and at least a second processing device that performs a second subset of the steps of the method. In some implementations, one or more steps of such a method may be performed by two or more of the one or more processing devices acting in combination Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:

one or more disks;

an actuator mechanism configured to position a selected head among one or more heads proximate to a corresponding disk surface among the one or more disks; and one or more processing devices comprising control circuitry, individually or in combination, wherein the control circuitry comprises an asynchronous demodulation module configured to:

receive demodulated split null burst signals based on the selected head reading a first set of bursts and a second set of bursts in a split burst servo pattern of the corresponding disk surface; and output, based on the demodulated split null burst signals, a radial position signal, indicative of a radial position of the selected head, a first null burst squared signal, and a second null burst squared signal;

wherein:

the first set of bursts comprises a first burst and a third burst each at a same first radial location on the corresponding disk surface;

the second set of bursts comprises a second burst and a fourth burst each at a same second radial location on the corresponding disk surface different than the first radial location; and respective bursts of the first set of bursts and respective bursts of the second set of bursts are disposed in an alternating manner along a longitudinal direction of a track containing the split burst servo pattern.

2. The data storage device of claim 1, wherein the control circuitry further comprises a burst demodulation module configured to output, to the asynchronous demodulation module, the demodulated split null burst signals based on the selected head reading the split burst servo pattern of the corresponding disk surface.

3. The data storage device of claim 1, wherein the demodulated split null burst signals comprise:

a first demodulated split null burst signal based on summing a first trigonometric function of respective values of a digital read-back signal sampled at the respective bursts of the first set of bursts;

a second demodulated split null burst signal based on summing a second trigonometric function of the respective values of the digital read-back signal sampled at the respective bursts of the first set of bursts;

a third demodulated split null burst signal based on summing the first trigonometric function of respective values of the digital read-back signal sampled at the respective bursts of the second set of bursts; and a fourth demodulated split null burst signal based on summing the second trigonometric function of the respective values of the digital read-back signal sampled at the respective bursts of the second set of bursts.

4. The data storage device of claim 1, wherein:

the first set of bursts consists of the first burst and the third burst each having a first length in the longitudinal direction; and the second set of bursts consists of the second burst and the fourth burst each having a second length in the longitudinal direction, the second length being equal to the first length.

5. The data storage device of claim 1, wherein:

the first set of bursts consists of the first burst, the third burst, and a fifth burst, the first burst and the fifth burst each having a first length in the longitudinal direction, and the third burst having a second length in the longitudinal direction; and the second set of bursts consists of the second burst and the fourth burst each having the second length in the longitudinal direction.

6. The data storage device of claim 1, wherein:

the first set of bursts consists of the first burst, the third burst, and a fifth burst each having a first length in the longitudinal direction; and the second set of bursts consists of the second burst, the fourth burst, and a sixth burst each having a second length in the longitudinal direction, the second length being equal to the first length.

7. The data storage device of claim 1, wherein the one or more processing devices further comprise a servo control processor, individually or in combination, wherein the servo control processor is configured to receive the radial position signal from the asynchronous demodulation module.

8. The data storage device of claim 7, wherein the servo control processor is further configured to receive the first null burst squared signal and the second null burst squared signal from the asynchronous demodulation module.

9. The data storage device of claim 8, wherein the servo control processor is further configured to output a position error signal (PES) based on the radial position signal, the first null burst squared signal, and the second null burst squared signal.

10. The data storage device of claim 1, wherein the asynchronous demodulation module is further configured to output the radial position signal such that the radial position signal covers substantially a full servo track.

11. The data storage device of claim 10, wherein the asynchronous demodulation module is further configured to output the radial position signal such that the radial position signal covers substantially the full servo track from a minus substantially half-track position signal to a plus substantially half-track position signal for the full servo track, corresponding to a minus substantially half-track position of the full servo track to a plus substantially half-track position of the full servo track.

12. The data storage device of claim 11, wherein the asynchronous demodulation module is further configured to output the radial position signal such that the radial position signal covers the full servo track with a single continuous position signal with a substantially continuous slope and free of stitching points within the radial position signal covering substantially the full servo track.

13. A method comprising:

receiving, by an asynchronous demodulation module of control circuitry of a data storage device, demodulated split null burst signals based on a selected head reading a first set of bursts and a second set of bursts in a split null burst servo pattern of a corresponding disk surface; and outputting, by the asynchronous demodulation module and based on the demodulated split null burst signals, a radial position signal indicative of a radial position of the selected head, wherein:

the first set of bursts comprises a first burst and a third burst each at a same first radial location on the corresponding disk surface;

the second set of bursts comprises a second burst at a second radial location on the corresponding disk surface different than the first radial location;

the first burst, the second burst, and the third burst are disposed in an alternating manner along a longitudinal direction of a track containing the split null burst servo pattern;

the first burst and the third burst each have a first length in the longitudinal direction;

the second burst has a second length in the longitudinal direction different than the first length; and wherein the receiving and the outputting are performed by one or more processing devices individually or in combination.

14. The method of claim 13, wherein the demodulated split null burst signals comprise:

a first demodulated split null burst signal based on summing a first trigonometric function of respective values of a digital read-back signal sampled at respective bursts of the first set of bursts;

a second demodulated split null burst signal based on summing a second trigonometric function of the respective values of the digital read-back signal sampled at the respective bursts of the first set of bursts;

a third demodulated split null burst signal based on summing the first trigonometric function of respective values of the digital read-back signal sampled at respective bursts of the second set of bursts; and a fourth demodulated split null burst signal based on summing the second trigonometric function of the respective values of the digital read-back signal sampled at the respective bursts of the second set of bursts.

15. One or more processing devices, individually or in combination, comprising an asynchronous demodulation module of control circuitry of a data storage device, the asynchronous demodulation module comprising:

means for receiving demodulated split null burst signals based on a selected head reading a first set of bursts and a second set of bursts in a split burst servo pattern of a corresponding disk surface; and means for outputting, based on the demodulated split null burst signals, a radial position signal, indicative of a radial position of the selected head, wherein the demodulated split null burst signals comprise:

a first demodulated split null burst signal based on summing a first trigonometric function of respective values of a digital read-back signal sampled at respective bursts of the first set of bursts;

a second demodulated split null burst signal based on summing a second trigonometric function of the respective values of the digital read-back signal sampled at the respective bursts of the first set of bursts;

a third demodulated split null burst signal based on summing the first trigonometric function of respective values of the digital read-back signal sampled at respective bursts of the second set of bursts; and a fourth demodulated split null burst signal based on summing the second trigonometric function of the respective values of the digital read-back signal sampled at the respective bursts of the second set of bursts.

16. The data storage device of claim 1, wherein the radial position signal is generated in read/write channel circuitry.

17. The data storage device of claim 1, wherein the asynchronous demodulation module is in read/write channel circuitry separate from a servo control processor.

18. The data storage device of claim 1, wherein the first burst precedes the second burst, the second burst precedes the third burst, and the third burst precedes the fourth burst along the longitudinal direction of the track containing the split burst servo pattern.

19. The data storage device of claim 1, wherein the respective bursts of the first set of bursts each have a same first pattern polarity and the respective bursts of the second set of bursts each have a same second pattern polarity different than the first pattern polarity.

20. The data storage device of claim 19, wherein the first pattern polarity and the second pattern polarity are configured such that a polarity of a read-back signal obtained by reading the first set of bursts is inverted relative to the polarity of the read-back signal obtained by reading the second set of bursts.

* * * * *